(12) United States Patent
Fleischmann et al.

(10) Patent No.: US 8,137,091 B2
(45) Date of Patent: Mar. 20, 2012

(54) STRETCHING ROD HOLDING ARRANGEMENT

(75) Inventors: Hans-Juergen Fleischmann, Steinberg am See (DE); Erik Blochmann, Neutraubling (DE); Florian Geltinger, Neufahrn (DE)

(73) Assignee: KRONES AG, Neutraubling (DE)

( * ) Notice: Subject to any disclaimer, the term of this patent is extended or adjusted under 35 U.S.C. 154(b) by 604 days.

(21) Appl. No.: 12/251,104

(22) Filed: Oct. 14, 2008

(65) Prior Publication Data

US 2009/0098235 A1  Apr. 16, 2009

(30) Foreign Application Priority Data

Oct. 12, 2007  (DE) .......................... 10 2007 049 283

(51) Int. Cl.
*B29C 49/12*     (2006.01)
(52) U.S. Cl. ........................................ 425/182; 425/529
(58) Field of Classification Search .................. 425/182, 425/529
See application file for complete search history.

(56) References Cited

U.S. PATENT DOCUMENTS

| | | |
|---|---|---|
| 4,284,397 A | 8/1981 | Michel |
| 4,379,688 A | 4/1983 | Tate et al. |
| 2007/0108157 A1 | 5/2007 | Dupuis et al. |

FOREIGN PATENT DOCUMENTS

| | | |
|---|---|---|
| DE | 602004007292 T2 | 3/2008 |
| EP | 1694492 B1 | 8/2006 |
| EP | 1 919 689 B1 | 5/2008 |
| FR | 2720678 A1 | 8/1995 |
| FR | 2863929 A1 | 6/2005 |
| FR | 2889671 A1 | 2/2007 |
| WO | 95/33616 A1 | 12/1995 |
| WO | 2005068159 A1 | 7/2005 |
| WO | 2007020355 A1 | 2/2007 |

*Primary Examiner* — Robert B Davis
(74) *Attorney, Agent, or Firm* — Rissman, Hendricks & Oliverio, LLP

(57) ABSTRACT

A stretching rod holding arrangement may include a stretching rod for expanding plastic containers, wherein the stretching rod has an elongate rod-shaped main body and a holding body, which protrudes with respect to this rod-shaped main body in a radial direction of the rod-shaped main body. The arrangement comprises a receiving space for mounting the stretching rod, wherein at least one region of the holding body can be received by this receiving space, and the receiving space has a lower boundary wall in the longitudinal direction of the stretching rod. An opening is provided in this lower boundary wall, through which opening the main body of the stretching rod can pass. An arresting mechanism, which can be moved with respect to the receiving space between at least two positions, may be provided above the lower boundary wall in the longitudinal direction of the stretching rod. In the first position, the arresting mechanism allows the passage of the holding body in the longitudinal direction of the stretching rod, and in the second position prevents the passage of the holding body of the stretching rod.

19 Claims, 4 Drawing Sheets

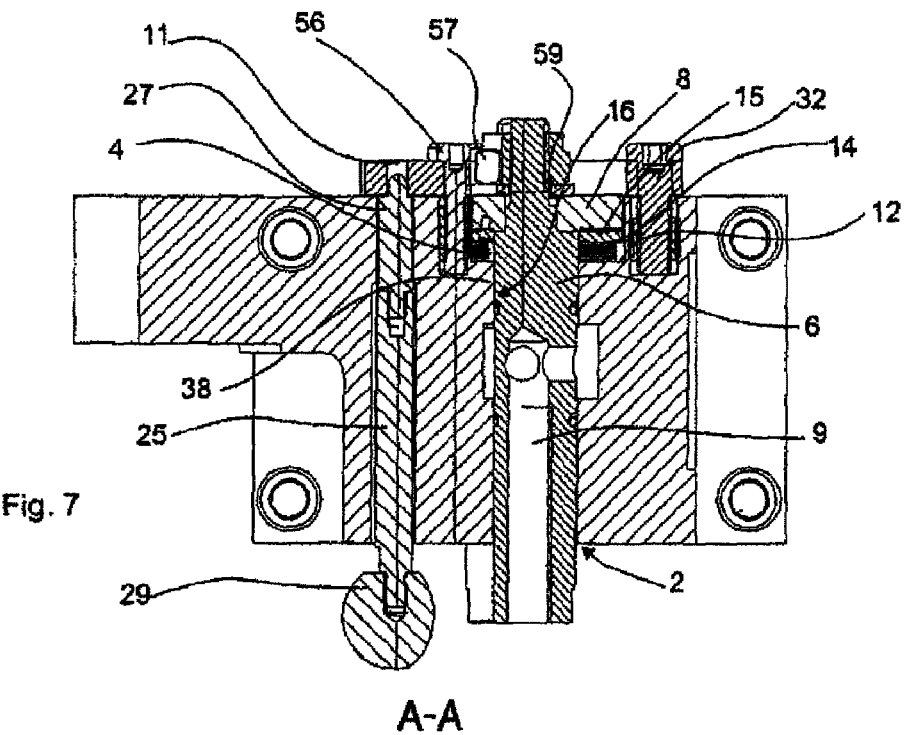
Fig. 7  A-A
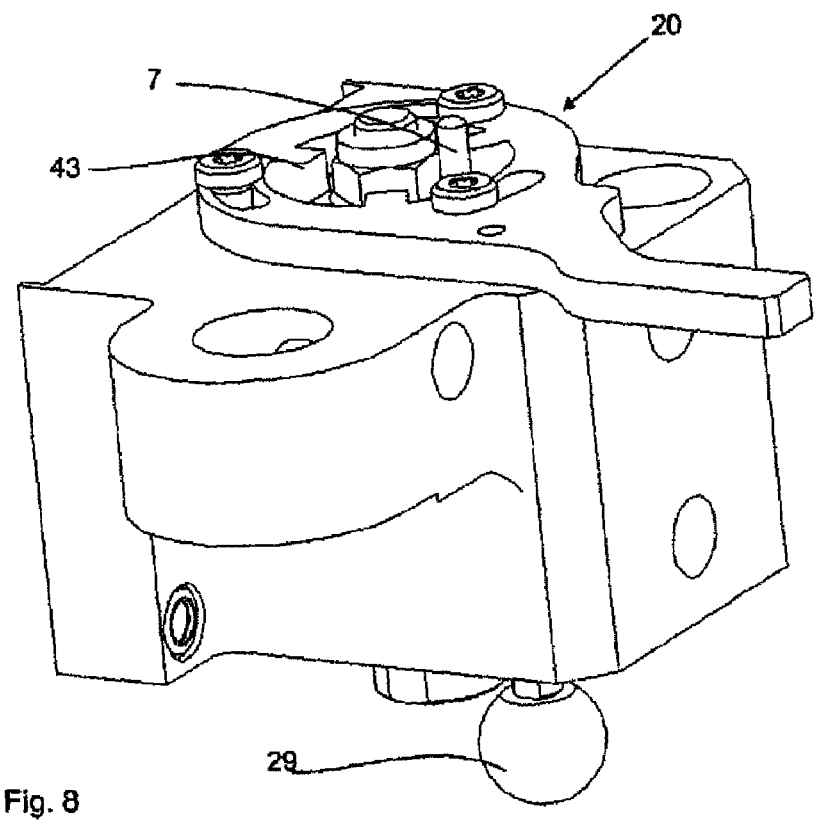
Fig. 8

STRETCHING ROD HOLDING ARRANGEMENT

CROSS-REFERENCE TO RELATED APPLICATION

This application claims the benefit of priority of German Patent Application No. 10 2007 049 283.0, filed Oct. 12, 2007, pursuant to 35 U.S.C. 119(a)-(d), the disclosure of which is incorporated herein by reference in its entirety as if fully set forth herein.

TECHNICAL FIELD

The present disclosure relates to a stretching rod holding arrangement, for example, for use in the production of plastic containers.

BACKGROUND

In the context of producing plastic bottles, it is customary that preforms are placed in a blow mould and are expanded in this blow mould for example by means of compressed air. Furthermore, in order to expand these preforms, usually a stretching rod is provided which carries out a stretching of the preform during the expansion process. In the prior art, such a stretching rod was in the past used for stretching different plastic containers. More recently, however, attention is increasingly being paid during the production of plastic containers to saving materials and obtaining uniform distributions of the material of the plastic bottle. The stretching rods, which are usually arranged on a support, are therefore also often changed when expanding different containers.

EP 1 694 492 B1 discloses an arrangement for releasably fixing a stretching rod on a slide. In said document, the stretching rod has on its outer circumference a precisely defined outer profile, and a housing has a mating profile adapted to this outer profile. In order to insert the stretching rod, the stretching rod is rotated into a position in which it can be passed through a top face of the housing. The stretching rod is then rotated inside the container and can in this way no longer be displaced in its longitudinal direction. An arresting of the stretching rod is thus possible as a result of this rotation of the stretching rod with respect to the housing. This apparatus offers a rapid possibility for changing stretching rods. However, in order to change the stretching rods, it is necessary for these to be rotated with respect to the housing. This is often problematic due to the accessibility of the stretching rod. Moreover, in the case of EP 1 694 492 B1, a rotation of the stretching rod with respect to the housing in the operating state must be prevented by additional releasable arresting means.

It may therefore be desirable to allow an uncomplicated and rapid process for changing stretching rods, wherein at the same time a high stability of the stretching rod with respect to its mount is achieved during working operation.

SUMMARY OF THE INVENTION

In a stretching rod holding arrangement according to the invention comprising a stretching rod for expanding plastic containers, the stretching rod has an elongate rod-shaped main body, a holding body which protrudes with respect to this rod-shaped main body in a radial direction of the rod-shaped main body, and also a stretching body which is introduced into the container to be stretched. Furthermore, a receiving space for mounting the stretching rod is provided, wherein at least one region of the holding body and, for example, the entire holding body can be received by this receiving space and the receiving space has a lower boundary wall in the longitudinal direction of the stretching rod, wherein an opening is provided in this lower boundary wall, through which opening the main body of the stretching rod can pass, but not the holding body.

According to the invention, an arresting mechanism which can be moved with respect to the receiving space and the stretching rod between at least two positions is provided above the lower boundary wall in the longitudinal direction of the stretching rod, wherein this arresting mechanism in the first position allows the passage of the holding body in the longitudinal direction of the stretching rod and in the second position prevents the passage of the holding body of the stretching rods in the longitudinal direction of the stretching rods. According to various aspects, the arresting mechanism is provided above the receiving space and delimits the latter in the upward direction.

As mentioned above, the rod-shaped main body of the stretching rod serves for stretching the plastic containers during the expansion process. The holding body is, for example, connected to the main body, for example by screw connections or the like. This holding body protrudes with respect to the outer circumference of the main body or has a circular segment-shaped protrusion which protrudes with respect to the main body. According to various aspects, the holding body can be completely received in the receiving space and in the installed state is delimited in the longitudinal direction of the stretching rod by the lower boundary wall on the one hand and the described arresting mechanism on the other hand. While it is provided in the prior art that the stretching rod is rotated about its own axis in order to be installed in the housing, such a rotation and thus a gripping of the stretching rod in order to arrest the latter is not necessary. Instead, the stretching rod may be inserted into the receiving space in a precisely defined rotational position and then the arresting mechanism is closed, so that any movement of the stretching rod back out of the receiving space is prevented. According to various aspects, the holding body is mounted on the stretching rod. However, it would also be possible that the stretching rod is already formed in one piece with the holding body.

In a further exemplary embodiment, the arrangement has engagement means which cause the stretching rod, in a state inserted into the receiving space, to be held in a rotationally fixed manner relative to the receiving space. In this way, as mentioned above, a greater stability is achieved between the stretching rod and the receiving space, without any arresting means that have additionally to be closed being required for this purpose.

In a further exemplary embodiment, a receiving body for receiving the main body of the stretching rod adjoins the lower boundary wall in the longitudinal direction below the lower boundary wall, wherein this receiving body completely encloses the main body of the stretching rod. By virtue of this further receiving body, a guidance of the stretching rod in its longitudinal direction is improved. The changing process, however, is not impaired by this receiving body.

In a further exemplary embodiment, at least one spring device is arranged between the lower boundary wall and the holding body. The spring device may comprise at least three springs which are designed in particular as compression springs. When installing the stretching rod in the receiving space, the stretching rod is pretensioned against the force of these spring devices and then the arresting mechanism is closed. In this way, a greater stability of the arrangement as a whole is achieved by means of the spring devices.

According to various aspects, at least one pressure element or a plurality of pressure elements, for example, a pressure ring, is provided above the spring devices. This pressure ring brings about a uniform distribution of the spring forces of the plurality of spring devices on the holding body of the stretching rod.

In a further exemplary embodiment, the arrangement has a locking device which locks the arresting mechanism in the second position. The second position is the closed position, in which the stretching rod is arrested in the receiving space. This position is intended to be locked by the locking device and thus secured.

In a further exemplary embodiment, the locking device has a pin which can move in the longitudinal direction of the stretching rod. According to various aspects, this pin engages in a recess of the arresting mechanism and thus prevents any further movement of this arresting mechanism. In this case, the arresting mechanism may be pivoted or moved in one plane, to which the longitudinal direction of the stretching rod is perpendicular.

In a further exemplary embodiment, the arresting mechanism can pivot about an axis, wherein this pivot axis is parallel to the longitudinal direction of the stretching rod. According to various aspects, this axis is located outside the main body of the stretching rod and, for example, also radially outside the holding body.

In a further exemplary embodiment, the pivot axis of the arresting mechanism substantially coincides with the axis of symmetry of the main body of the stretching rod.

In a further exemplary embodiment, the holding body has a circular segment-shaped or circular cross section.

In a further exemplary embodiment, the holding body has an inclined surface on its upper outer circumference. This inclined surface means that, during a closing operation of the arresting mechanism, the holding body is pushed towards the lower boundary wall of the receiving space.

In a further exemplary embodiment, the arresting mechanism has a semicircular recess. This semicircular recess can be pushed over the holding body of the stretching rod for closing purposes. In this case, the arresting mechanism is, for example, arranged at a point such that it can pivot with respect to the receiving space, and moreover has one, two or more longitudinal grooves which on the one hand hold the arresting mechanism in the longitudinal direction of the stretching rod but on the other hand allow the pivoting process about this pivot axis.

In a further exemplary embodiment, the holding body has a non-circular cross-sectional profile and an inner circumference of the arresting mechanism has a cross-sectional profile adapted to this cross-sectional profile. In this case, however, unlike in the prior art, it is not the stretching rod itself which is rotated but rather the arresting mechanism is rotated into a certain position, then the stretching rod is introduced with the holding body into the receiving space and finally the arresting mechanism is once again rotated in order to arrest the stretching rod in the receiving space.

The following invention also relates to an apparatus for expanding containers, comprising a blow mould and a stretching rod holding arrangement of the type described above.

Further advantages and embodiments will emerge from the appended drawings.

BRIEF DESCRIPTION OF THE DRAWINGS

In the drawings:

FIG. 7 shows a side view of the stretching rod holding arrangement of FIG. 6 along the line A-A in FIG. 6; and FIG. 8 shows a perspective view of the stretching rod holding arrangement of FIG. 5.

DETAILED DESCRIPTION

Figure 1:
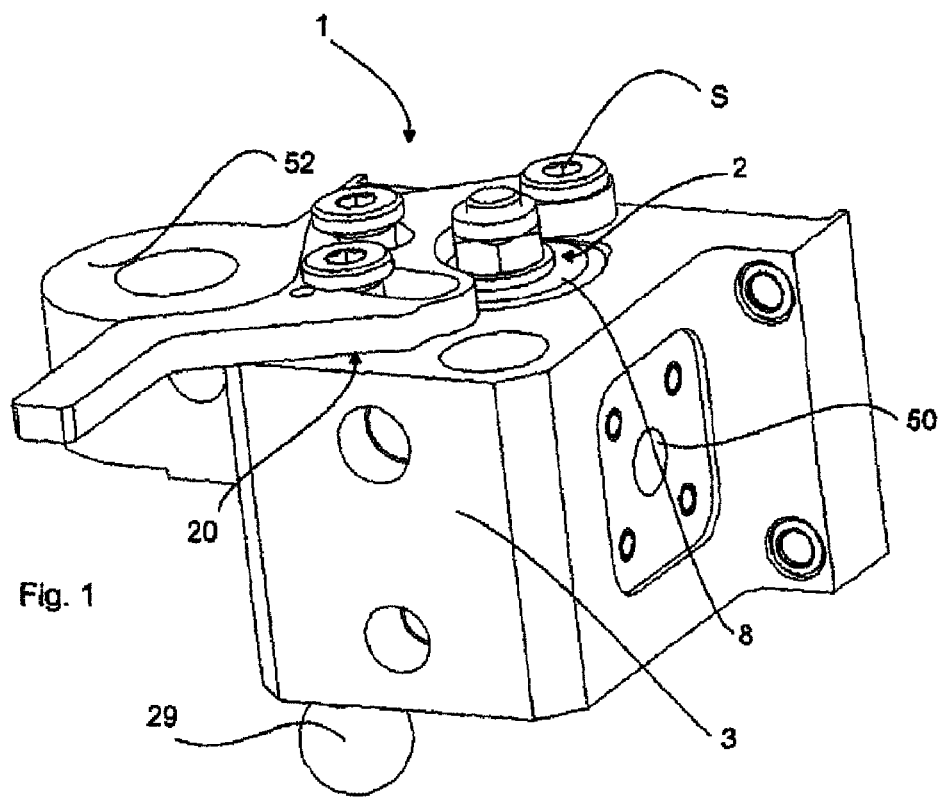
FIG. 1 shows a perspective view of a stretching rod holding arrangement according to the invention in a first embodiment.

FIG. 1 shows a stretching rod holding arrangement 1 in a first embodiment. Here, reference 2 denotes a stretching rod which is pushed into a housing 3. In this case, the stretching rod 2 is pushed in its longitudinal direction into this housing 3.

The stretching rod 2 has a holding body 8 which here has a partially circular profile. This holding body 8 is inserted into a cavity (not shown in FIG. 1) which at the same time forms the receiving space for the holding body 8 and the stretching rod 2. The stretching rod 2 moreover has a stretching body 6a, which is then actually introduced into a container to be stretched and comes into contact with the latter.

Reference 20 denotes in its entirety an arresting mechanism which, as mentioned above, in one position arrests the stretching rod 2 with respect to the housing 3 and in another position allows a movement of the stretching rod 2 in its longitudinal direction and thus allows the stretching rod 2 to be removed from or inserted into the housing 3. Reference 52 denotes a fixing body for arranging the housing on further devices, such as a slide for example.

Via a feed device 50, air for expanding containers can be fed to the stretching rod 2 arranged in the interior of the housing 3 or to the main body 6 of this stretching rod 2. The arresting mechanism 20 can be pivoted about a pivot axis S. In FIG. 1 and also in the other figures, the arresting mechanism 20 is shown in the position in which it prevents the passage of the holding body and thus also of the stretching rod, that is to say an arrested position. By pivoting the handle 22 about the pivot axis in the clockwise direction, the arresting mechanism 20 can be opened.

Figure 2:
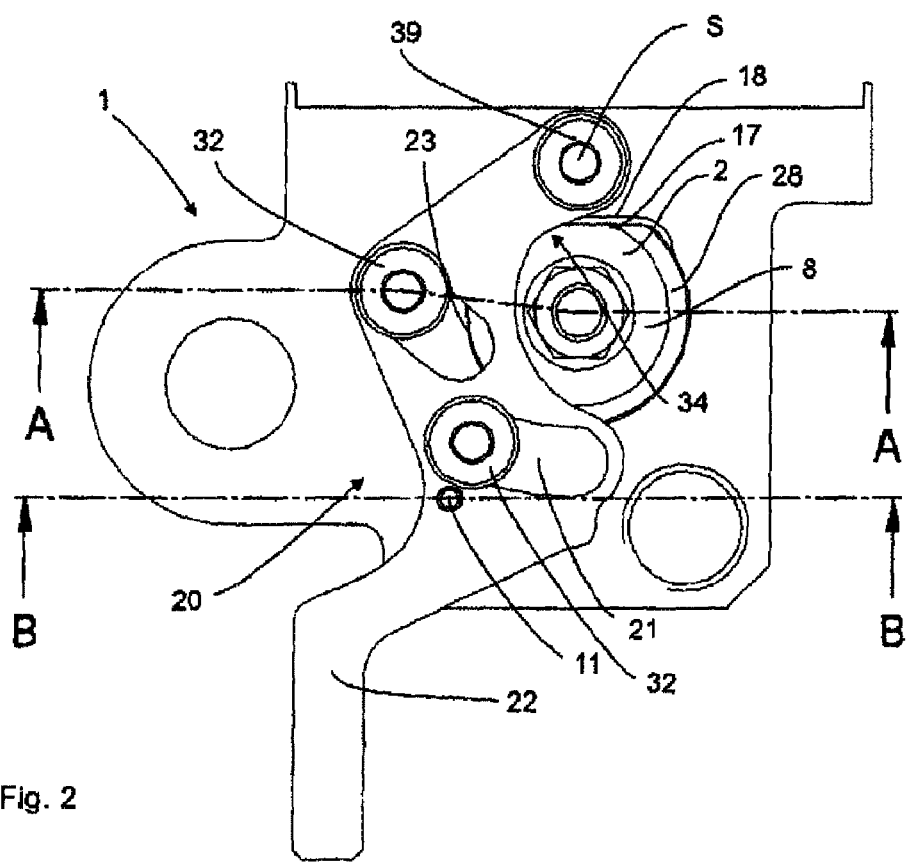
FIG. 2 shows a plan view of the stretching rod holding arrangement of FIG. 1.

FIG. 2 shows a plan view of the stretching rod holding arrangement of FIG. 1. It can be seen that three screw bodies 32 and 39 are arranged here on the housing 3. In this case, the screw body 39 is arranged on the pivot axis S and the arresting mechanism 20 is pivoted here about this pivot axis. The two screw bodies 32 are also fixedly positioned with respect to the housing 3.

References 21 and 23 denote elongate holes which are provided in the arresting mechanism 20. These elongate holes at the same time also define the pivoting range by which the arresting mechanism 20 can be pivoted. The holding body 8 of the stretching rod 2 has an inclined surface 28 on its upper face. This inclined surface likewise serves for arresting the stretching rod. More specifically, when the arresting mechanism is pivoted in the anticlockwise direction, that is to say during the arresting operation, the pivoting lever is pushed over this inclined surface 28 and in this way pushes the holding body 8 and thus also the stretching rod 2 downwards.

Reference 34 denotes a recess in the arresting mechanism 20. This recess 34 is designed in such a way that, in the open state of the pivoting lever, the holding body of the stretching rod can be guided past this recess. It can also be seen that the holding body 8 is not exactly circular but rather has a flattened portion 17. Accordingly, the receiving space in the housing 3 also has a corresponding straight edge 18. This means that the stretching rod 2 can be inserted into the housing 3 only in a precisely defined rotational position and, once it has been inserted therein, can no longer be rotated with respect to the housing 3.

Figure 3:
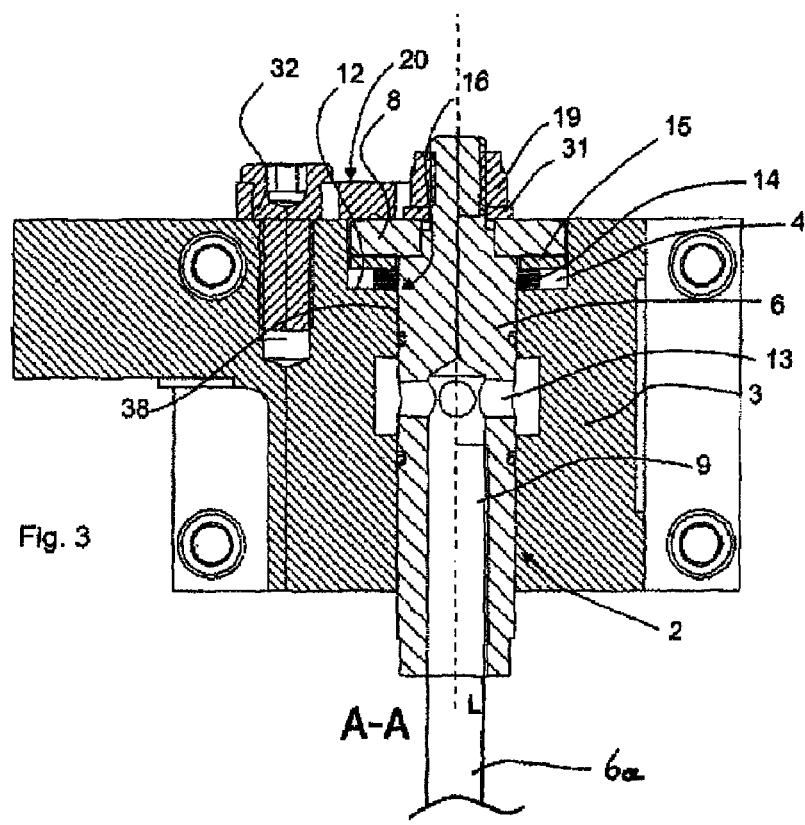
FIG. 3 shows a side view of the stretching rod holding arrangement of FIG. 2 along the line A-A of FIG. 2.

FIG. 3 shows a side view of the stretching rod holding arrangement 1 of FIG. 2 along the line A-A of FIG. 2. It can be seen that the stretching rod 2 has, next to the holding body 8, a rod-shaped main body 6. Provided within this rod-shaped main body 6 is a tube 9, through which air can be fed to the stretching rod and thus also to the containers via a feed device 13. Reference 19 denotes a screw body which serves for fixing the holding body to the main body 6 of the stretching rod 2. For this purpose, the screw body 19 is screwed together with a washer 31 onto the stretching rod 2 and in this way pushes the holding body 8 into a correspondingly shaped recess of the main body 6.

Reference 4 denotes a receiving space or a recess in the housing 3, into which the holding body 8 is pushed. This receiving space 4 is delimited by a lower boundary wall 12. This lower boundary wall 12 has an opening 16, through which only the main body 6 of the stretching rod 2 can pass, but not the holding body 8. Also provided on the lower boundary wall are springs, more specifically three compression springs 14, and above these compression springs a pressure ring 15 which in this way exerts an upward force on the holding body 8. By virtue of these compression springs 14 together with the arresting mechanism, the stretching rod is also fixed in its longitudinal direction with respect to the housing 3. Reference 32 once again here denotes the screw connection which allows a pivoting movement of the arresting mechanism 20 but not a detachment in the longitudinal direction L of the stretching rod 2.

Below the receiving space 4, the latter is adjoined by a receiving body 38 for receiving the main body 6. This receiving body 38 substantially completely encloses the main body 6 of the stretching rod 2 and at the same time also guides the latter, so that the stretching rod 2 is also fixedly mounted in its radial direction.

Figure 4:
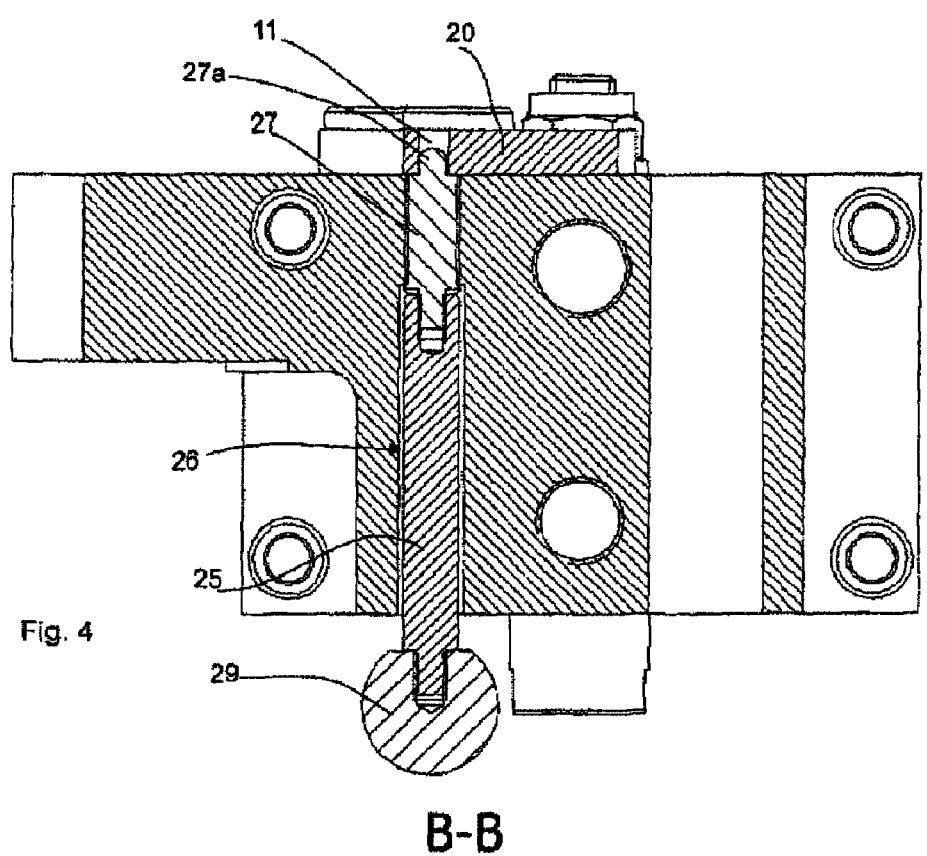
FIG. 4 shows a side view of the stretching rod holding arrangement of FIG. 2 along the line B-B of FIG. 2.

FIG. 4 shows a side view of the apparatus shown in FIG. 2, along the line B-B of FIG. 2. Shown here is the locking device 26 which locks the arresting mechanism 20. More specifically, by means of the locking device 26, the arresting mechanism 20 is fixed in the closed position. For this purpose, the locking device 26 has a pin 27 with a pressure part 27a which can enter a correspondingly shaped opening 11 in the arresting mechanism 20 (also shown in FIG. 2), and in this way prevents any pivoting of the arresting mechanism. In the open position, the pin 27 is fixed in the opening 11a. Reference 25 denotes a rod which is connected to the pin 27 and which, via a ball handle 29, allows the latter to be pulled out. It is possible in this case that the locking device is pushed upwards in a spring-loaded manner, in order to pass automatically into a locked position.

Figure 5:
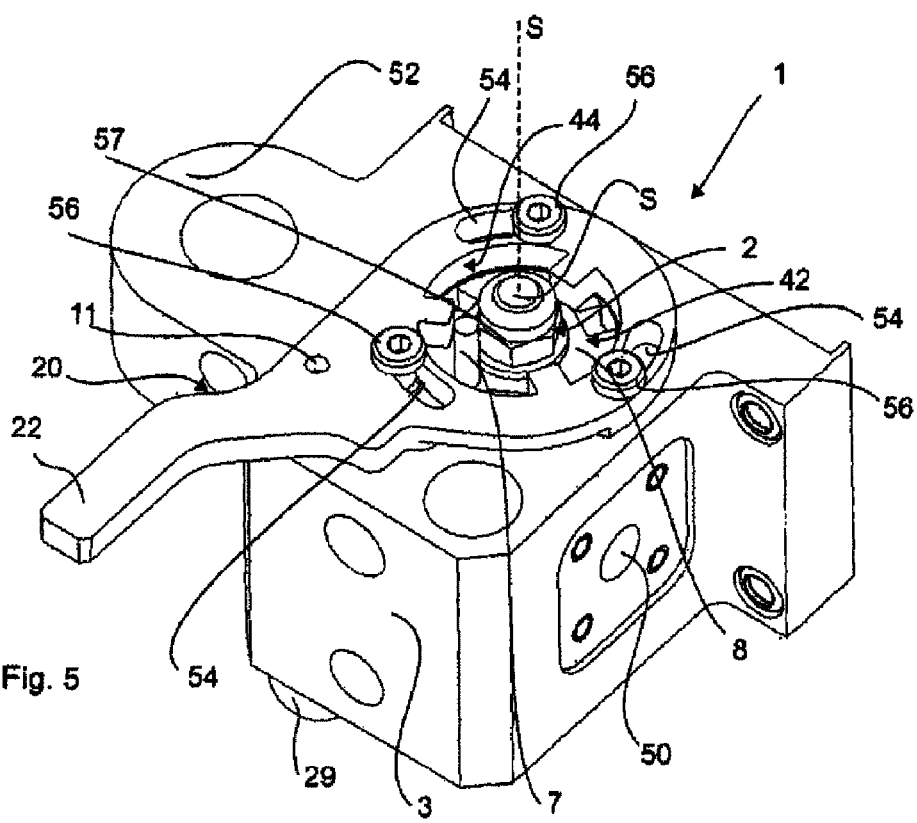
FIG. 5 shows a stretching rod holding arrangement in a further embodiment.

FIG. 5 shows a further embodiment of a stretching rod holding arrangement 1 according to the invention. While in the case of FIGS. 1-4 the arresting mechanism 20 has a semicircular recess 34, in the case of the embodiment shown in FIGS. 5-8 it has a closed cross-sectional profile 44. Accordingly, in this embodiment, the stretching rod or the holding body 8 of the stretching rod also has a cross-sectional profile 42 adapted to the cross-sectional profile 44 of the arresting mechanism 20.

For insertion purposes, the stretching rod 2 is again pushed into the housing 3 or the receiving space 4 in a defined position and then the arresting mechanism 20 is pivoted about the pivot axis S, wherein the pivot axis S is arranged here substantially in the centre of the cross-sectional profile 44. For this purpose, the arresting mechanism has three elongate holes 54 which allow a pivoting of the arresting mechanism by a predefined angle with respect to this pivot axis. Reference 57 here denotes a nut which serves to fix the holding body to the main body 6 of the stretching rod. The screw connections 56 are guided in the elongate holes.

Figure 6:
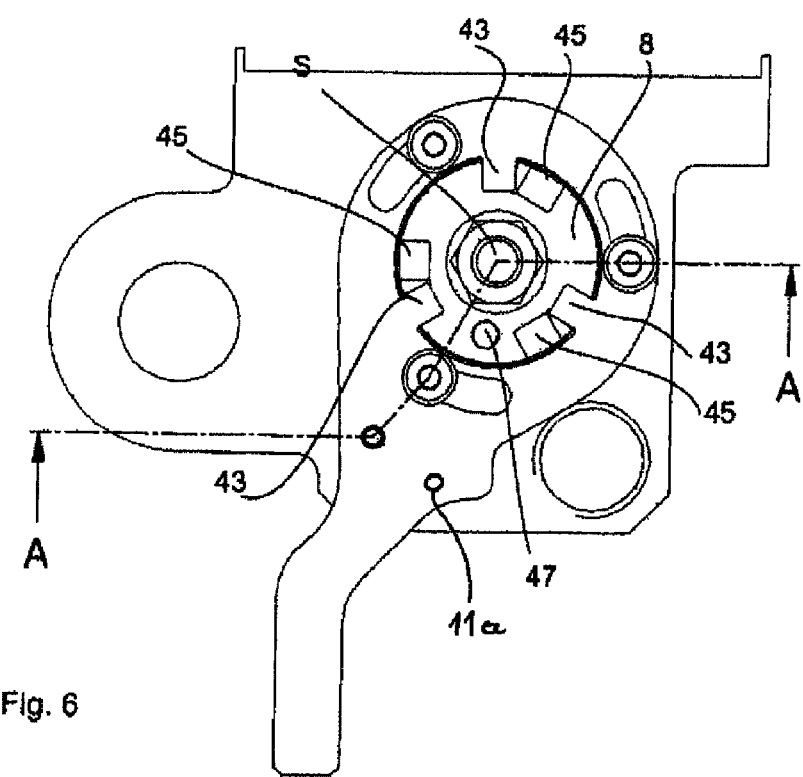
FIG. 6 shows a plan view of the stretching rod holding arrangement of FIG. 5.

FIG. 6 shows a plan view of the stretching rod holding arrangement of FIG. 5. It can be seen that the cross-sectional profile 44 of the inner circumference of the arresting device 3 has radially inward-pointing protrusions 43 and the holding body 8 accordingly has three recesses 45 adapted to these protrusions. Reference 47 denotes an opening which is provided in the holding body and once again serves for centering the stretching rod. The pin 7 shown in FIG. 5 is introduced into this opening 47. However, it would also be possible in the embodiment shown in FIG. 6 to distribute the protrusions 43 not at equal spacings in the circumferential direction but rather at unequal spacings, and in this way to permit only a precise rotational position of the stretching rod. The protrusions 43 could also be shaped differently in order to achieve the desired fixing of the rotational position of the stretching rod.

In the embodiment shown in FIG. 7 too, therefore, during the insertion of the stretching rod 2, the arresting mechanism 20 is open, i.e. in the position (not shown). Also in this position, the arresting mechanism is secured by means of the pin 27 or the pressure piece 27a. In order to open it from the closed position, the locking device 26, as mentioned above, is pulled downwards by means of a ball handle 29. During the locking process, the protrusions 43 slide over inclined surfaces (not shown) on the holding body 8 and in this way push the holding body 8 against the pressure ring 15 located therebelow, thereby loading springs 14 arranged below the pressure ring. The compression springs 14 compensate the play between the arresting mechanism 20 and the holding body 8, in order in this way to prevent any play between these components in the operating state.

The view shown in FIG. 7 partially corresponds to the view shown in FIG. 3, and therefore reference will be made in this respect to what has been stated above. In this embodiment too, as mentioned above, three screw connections 56 are provided, but these are distributed at equal spacings in the circumferential direction of the arresting device 20 and in this way also allow a uniform distribution of the force acting in the axial direction of the stretching rod 2.

FIG. 8 shows a further perspective view of the stretching rod holding arrangement of FIG. 5. It is possible here to see the pin 7, which is guided through the opening 47 shown in FIG. 6 and in this way fixes the rotational position of the stretching rod 2.

It will be apparent to those skilled in the art that various modifications and variations can be made to the stretching rod holding arrangement of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Stretching rod holding arrangement, comprising:
a stretching rod for expanding plastic containers, the stretching rod having an elongate rod-shaped main body, a stretching body, and a holding body, the holding body protruding with respect to the rod-shaped main body in a radial direction of the rod-shaped main body;
a receiving space for mounting the stretching rod, the receiving space being configured to receive at least one region of the holding body, the receiving space having a lower boundary wall in the longitudinal direction of the stretching rod, an opening being provided in this lower boundary wall, through which opening the main body can pass; and
an arresting mechanism above the lower boundary wall in the longitudinal direction of the stretching rod, the arresting mechanism being movable with respect to the receiving space between at least two positions,
wherein, in a first position, the arresting mechanism allows passage of the holding body in the longitudinal direction of the stretching rod, and, in a second position, the arresting mechanism prevents the passage of the holding body of the stretching rod.

2. Arrangement according to claim 1, wherein the holding body is mounted on the stretching rod.

3. Arrangement according to claim 1, wherein the main body and the stretching body are formed in one piece.

4. Arrangement according to claim 3, wherein the main body, the stretching body, and the holding body are formed in one piece.

5. Arrangement according to claim 1, further comprising engagement means which cause the stretching rod, in a state inserted into the receiving space, to be held in a rotationally fixed manner relative to the receiving space.

6. Arrangement according to claim 1, further comprising a receiving body for receiving the main body of the stretching rod, the receiving body adjoining the boundary wall in the longitudinal direction below the lower boundary wall, the receiving body completely enclosing the main body.

7. Arrangement according to claim 1, further comprising at least one spring device arranged between the lower boundary wall and the holding body.

8. Arrangement according to claim 7, further comprising at least one pressure ring above the spring device.

9. Arrangement according to claim 1, further comprising a locking device configured to lock the arresting mechanism in the second position.

10. Arrangement according to claim 9, wherein the locking device includes a pin configured to move in the longitudinal direction of the stretching rod.

11. Arrangement according to claim 1, wherein the arresting mechanism is configured to pivot about an axis, said pivot axis being parallel to the longitudinal direction of the stretching rod.

12. Arrangement according to claim 11, wherein the pivot axis runs outside the holding body in the radial direction of the stretching rod.

13. Arrangement according to claim 11, wherein the pivot axis substantially coincides with the axis of symmetry of the main body of the stretching rod.

14. Arrangement according to claim 1, wherein the holding body has a circular segment-shaped cross section.

15. Arrangement according to claim 1, wherein the holding body includes an upper outer circumference having an inclined surface.

16. Arrangement according to claim 1, wherein the arresting mechanism has a semicircular recess.

17. Arrangement according to claim 1, wherein the holding body has a non-circular cross-sectional profile, and an inner circumference of the arresting mechanism has a cross-sectional profile adapted to said circular cross-sectional profile of the holding body.

18. Arrangement according to claim 17, wherein the cross-sectional profiles are of uniform shape in the circumferential direction.

19. Apparatus for expanding containers, comprising:
a blow mould; and
a stretching rod holding arrangement according to claim 1 associated with the blow mould.

* * * * *